(12) United States Patent
Ogaz (10) Patent No.: US 8,816,517 B2
(45) Date of Patent: Aug. 26, 2014

(54) ENERGY STORAGE SYSTEM USING SPRINGS

(76) Inventor: Ronald S. Ogaz, Los Gatos, CA (US)

( * ) Notice: Subject to any disclaimer, the term of this patent is extended or adjusted under 35 U.S.C. 154(b) by 5 days.

(21) Appl. No.: 13/493,838

(22) Filed: Jun. 11, 2012

(65) Prior Publication Data

US 2012/0313380 A1  Dec. 13, 2012

Related U.S. Application Data

(60) Provisional application No. 61/495,973, filed on Jun. 11, 2011.

(51) Int. Cl.
*F02B 63/04* (2006.01)

(52) U.S. Cl.
USPC .................................................. 290/1 E

(58) Field of Classification Search
USPC ...... 290/1 E; 185/9, 37, 40 R; 92/132, 130 D; 60/519

IPC ............................................... Y02E 70/30
See application file for complete search history.

(56) References Cited

U.S. PATENT DOCUMENTS

| | | | |
|---|---|---|---|
| 5,929,531 A * | 7/1999 | Lagno | 290/53 |
| 7,656,050 B2 | 2/2010 | Riley | |
| 7,770,331 B2 | 8/2010 | Halloran | |
| 8,154,142 B2 * | 4/2012 | Nies | 290/44 |
| 2006/0032374 A1 | 2/2006 | Vrana et al. | |
| 2009/0021012 A1 * | 1/2009 | Stull et al. | 290/44 |
| 2012/0161450 A1 * | 6/2012 | Cutts | 290/1 |

* cited by examiner

*Primary Examiner* — Vanessa Girardi
(74) *Attorney, Agent, or Firm* — Silicon Valley Patent Group LLP (57) ABSTRACT

An energy storage system used to store energy is disclosed. The system uses compression, torsion, extension and/or leaf springs to store energy. Input energy is use to compress the springs through an apparatus. The potential energy in the compressed spring is used to run a generator, which provides power to the consumer.

17 Claims, 8 Drawing Sheets

ENERGY STORAGE SYSTEM USING SPRINGS

CROSS-REFERENCE TO RELATED APPLICATIONS

This application claims the benefit under 35 U.S.C. 119(e) of U.S. Provisional Application Ser. No. 61/495,973, filed Jun. 11, 2011, which is incorporated herein in its entirety by reference.

BACKGROUND OF THE INVENTION

1. Field of the Invention

The invention relates generally to energy storage and more specifically to an energy storage system using springs.

2. Background of the Invention

Existing methods of electrical power storage and generation used to provide alternative or backup power sources to established energy grid systems have various difficulties associated with them. These existing systems are often expensive, inefficient, have a limited lifetime and/or generation capacity. A continuing need exists for improvements in power storage and generation. Particularly, a continuing need exists to provide inexpensive and a long lasting renewable energy system.

The primarily method for storing energy for future use uses a chemical batteries to store charge. Chemical batteries are expensive and need to be replaced periodically. Alternatively, hydroelectric system using potential energy has been used to replace chemical batteries. For example, U.S. Pat. No. 7,656,050 titled "Hydroelectric pumped-storage" and issued Feb. 2, 2010, relates to storage of energy using aquifers. During a time a high demand, fluid flows under the influence of gravity from a first aquifer to a second aquifer, during which time the kinetic energy of the fluid is converted into electrical energy. During a time of low demand, fluid is moved (e.g., by turbine) from the second aquifer back to the first aquifer. Unfortunately, large amounts of fluid (thousands of acre feet) are needed to store a significant amount of energy. In U.S. Patent Publication No. 2006-0032374 titled "Hydraulic liquid pumping system" and published Feb. 16, 2006, a liquid pumping system utilizes liquid to compress a gas and uses a part of the compressed gas to recycle the liquid within the system. Unfortunately, as the gas is compress the gas heats up and without proper insulation the stored energy is lost through heat conduction. It is also difficult to convert the heat energy back into electrical energy. In U.S. Pat. No. 7,770,331 titled "Potential energy storage system" and issued Aug. 10, 2010, hydraulic support cylinders are arranged vertically below a building support columns and mounted on the foundation. Each cylinder is a reversible hydraulic turbine generator that generates electricity during peak demand. Fluid is allowed to discharge from the hydraulic support cylinders, through hydraulic turbine generator, into a reservoir. The building's weight thus provides potential energy on demand via the pressurized fluid. During off-peak hours, the hydraulic turbine generator is operated in reverse. Unfortunately using a building weight to pressurize the fluid is not portable and needs to be designed into the building making it cumbersome to use.

What is needed as an energy storage system that will be able store a greater amount of energy per volume and that will last for decades with nearly unlimited recharges with minimal maintenance.

SUMMARY

Some embodiments of the present invention provide for a method of holding energy, the method comprising: storing potential energy into a plurality of springs; and releasing potential energy from the plurality of springs to drive a generator to produce electricity. Some embodiments of the present invention provide for a system of holding energy, the system comprising: an enclosure; a plurality of springs inside of the enclosure; a pump coupled to the enclosure, wherein the pump is for storing potential energy into the plurality of springs; a plate coupled inside of the enclosure and coupled to the plurality of springs; and a generator coupled to the plate.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

Some embodiments of the present invention disclose an energy storage system that compresses springs to store energy and a liquid or gas to transfer that energy into and out of the energy storage system. Some embodiments use one of several spring types, such as compression, torsion, extension and/or leaf springs, to store energy. A mechanical means, such as a flywheel, gears or a bladder, may be used to transfer energy in and out of the energy storage system. A compression spring may store a maximum amount of energy. A number of springs may be arranged in a spring array in a large enclosure (e.g., a reinforced 40×8×8 foot shipping container). A plate (e.g., made from steel) may be used to distribute compression force of the individual spring evenly across the spring array. To store energy, springs are compressed. To extract energy, a generator is used to convert the stored spring energy into electrical power (AC or DC). A power control loop controls a flow control valve to regulate the amount of energy generated. The flow control valve may adjust the fluid flow in response to power fluctuations.

To compress the spring array, several options are available. For example, a bladder may rest on the plate and may contain a liquid or gas under pressure. A high pressure pump pressurizes the bladder, which will compress and store energy in the spring array. When released, the liquid or gas under pressure runs a hydroelectric generator to create electrical energy. Alternatively, a hydraulic pump may be used to compress the springs, thereby replacing the liquid bladder. The plate may be connected to a gear, which when engaged, covers the compression forces of the spring array to rotate the gear.

Figure 1:
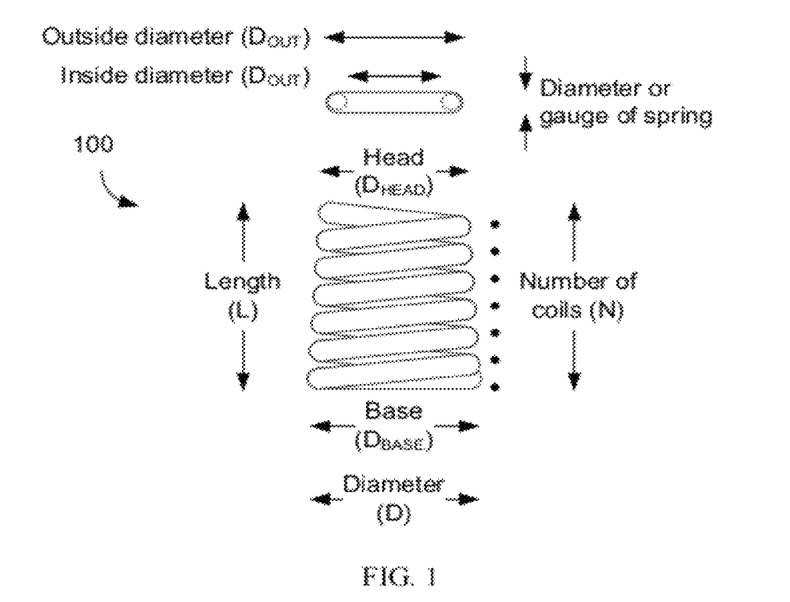
FIGS. 1, 2 and 3 disclose spring dimensions for calculating an amount of potential energy stored.
Figure 2:
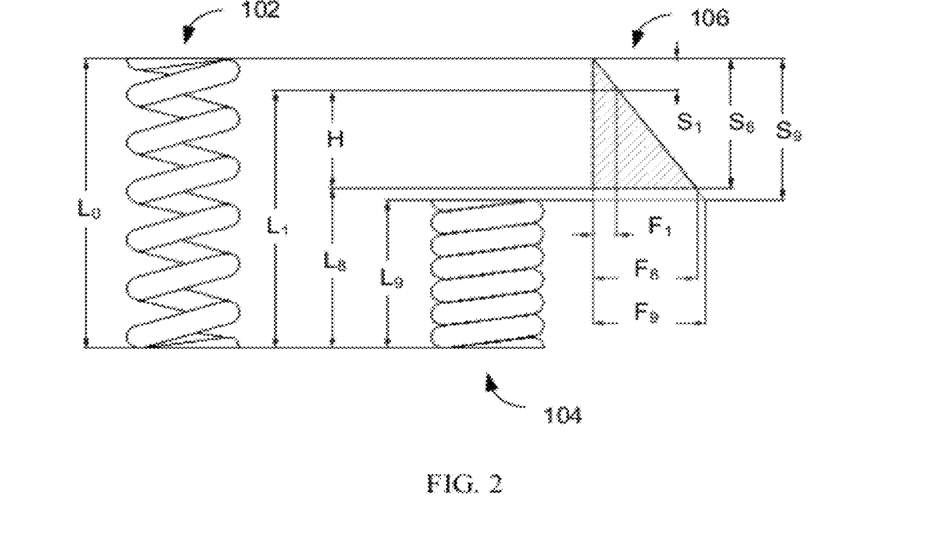
Figure 3:
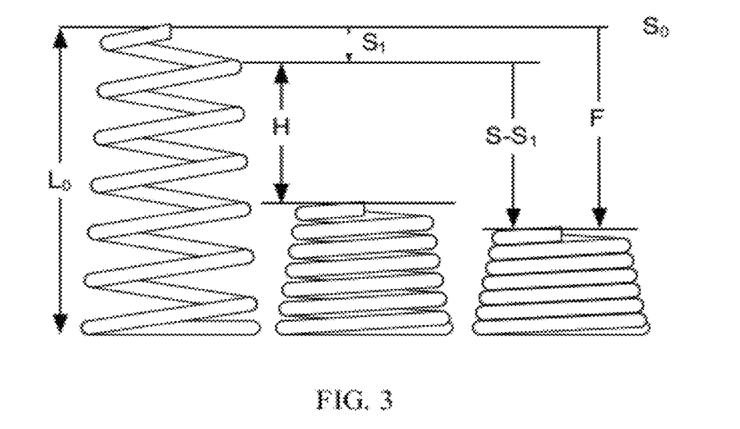

FIGS. 1, 2 and 3 disclose spring dimensions for calculating an amount of potential energy stored. FIG. 1 shows a typical spring 100 defining a diameter (D) and a length (L). A spring 100 may be characterized by a type of wire used, a diameter or gauge (AWG) of the wire, an outside and inside width of the spring, a free length ($L_0$) of the spring, working length ($L_1$) of the spring, number coils (N) and whether the wire is and hot or cold rolled. A spring 100 may be straight such that the base and head diameters are the same diameter (D). Alternatively, a spring 100 may be tapered such that the base diameter ($D_{BASE}$ or wide end) is greater than the head diameter ($D_{HEAD}$ or narrow end).

FIG. 2 shows relationships between a spring 100 in an uncompressed state 102 and a compressed state 104 using a force diagram 106. The spring 100 in an uncompressed state 102 has a length $L_0$ and provides zero force ($F_0$) as shown in the force diagram 106. A small amount of force ($F_1$) (e.g., from the distributed weight of an empty bladder and a plate across a spring array) compresses the spring from a length of $L_0$ to $L_1$. A larger amount of force ($F_8$) (e.g., from the pressure of full bladder) compresses the spring 100 from a length of $L_1$ to $L_8$. The spring 100 operates in a linear region (H) between forces $F_1$ and $F_8$ (which corresponds with lengths between $L_1$ and $L_8$) and operates in a non-linear region between forces $F_8$ and $F_9$ (which corresponds with lengths between $L_8$ and $L_9$). The amount of compression is also defined by an amount the spring 100 is shortened such that the shortened length (S) plus the compressed length (L) is equal to the uncompressed length ($L_0$) (e.g., $L_0=L_1+S_1=L_8+s_8=L_9+S_9$). The force diagram 106 illustrates this linear relationship between spring length (L on the vertical axis) and spring compression force (F on the horizontal axis). The force diagram 106 has a slope defined by the spring constant k.

FIG. 3 relates a spring constant k to potential energy. A spring constant k=F/S, which may be define to represent this linear region, may be represented or computed in a number of ways, for example, $k=(F_8-F_0)/(S_8-S_0)$, $k=F_8/S_8$ or $k=(F_8-F_1)/(S_8-S_1)$. The potential energy (PE) stored in a spring 100 may be calculated by taking the force (F) applied to the spring 100 multiplied by the squared of the working distance (H). Therefore, the potential energy (PE) in a spring 100 then may be written as $$PE = \frac{1}{2}k \, H^2.$$

Figure 4:
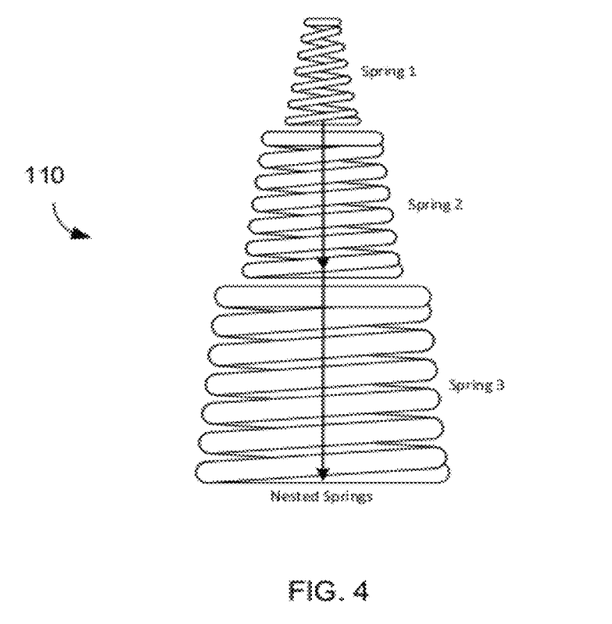
FIG. 4 illustrates a nested spring.

FIG. 4 illustrates a nested spring 110. To increase the amount of stored energy per volume, springs may be nested. It is possible to store several Watt-hours of energy (e.g., 70 Watt-hours (Wh) or 0.07 kilo Watt-hours (kWh) or more of energy per nested spring 110). For example, a spring 100 may be cold rolled, high carbon Chrome-vanadium alloy steel wire SAE 6150. This spring wire type may be produce a spring wire of up to 4 inches in diameter, springs widths of 24 inches and free spring lengths of up to 5 feet. Other spring materials may allow more energy storage per volume (e.g., carbon nanotube wire). Nesting several of these individual springs 100 as a nested spring 110 concentrates the potential energy to a smaller area than if the spring were positioned separately.

Figure 5:
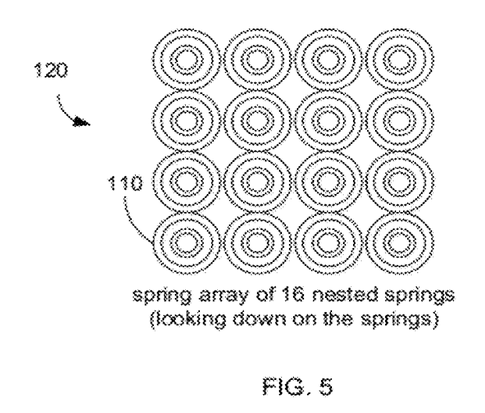
FIG. 5 shows a spring array.

FIG. 5 shows a spring array 120. The spring array 120 is made up of nested springs 110 each made from multiple individual springs 100. An assemble of 160 springs 100 in a spring array 120 may fit into a 40×8×8 foot enclosure. If each nested spring 110 stores 70 Watt-hours of energy, the spring array 120 in such an enclosure may store up to 11 KWh of energy. Unlike a chemical battery that last only a few years, a spring array 120 may operate with minimal maintenance for decades.

Calculations using a nested spring design have cold rolled high carbon Chrome-vanadium alloy steel wire SAE 6150 are described. A first outer spring having a 60-inch wire length ($L_0$), a 24-inch outside diameter ($D_{OUT}$), a 24-inch working length (H), a 3.75-inch wire diameter (gauge), and N=8 coils results in a spring 100 having a spring constant k=4,280 and a potential energy of PE=38 Watt-hours. A second middle spring having outside diameter ($D_{OUT}$) of 15 inches, a wire diameter of 2.625 inches and a coil count to N=9 results in a spring 100 having a spring constant k=2,340 and a potential energy of PE=21 Watt-hours. A third center spring having 60-inch wire length ($L_0$), a 10-inch outside diameter ($D_{OUT}$), a 24-inch working length (H), a 1.75-inch wire diameter (gauge), and N=20.8 coils results in a spring 100 having a spring constant k=1,170 and having a potential energy of PE=11 Watt-hours. Combining the three individual springs 100 into a nested spring 110 results in a total Watt-hours for nested spring 110 of 70 Watt-hours. A total number of nested springs 110 that fit into an 40×8×8 container is estimated to be 160 nested springs 110 with stacking two spring arrays 120 one top of the other. In this instance, a total Watt-hours per 40×8×8 container is 11.2 kWh, which may provide power for a standard American home for two days with no energy input into the system. Storing energy into a system and using energy from the system are independent process so the both processes may be done simultaneously unlike some known systems.

Figure 6:
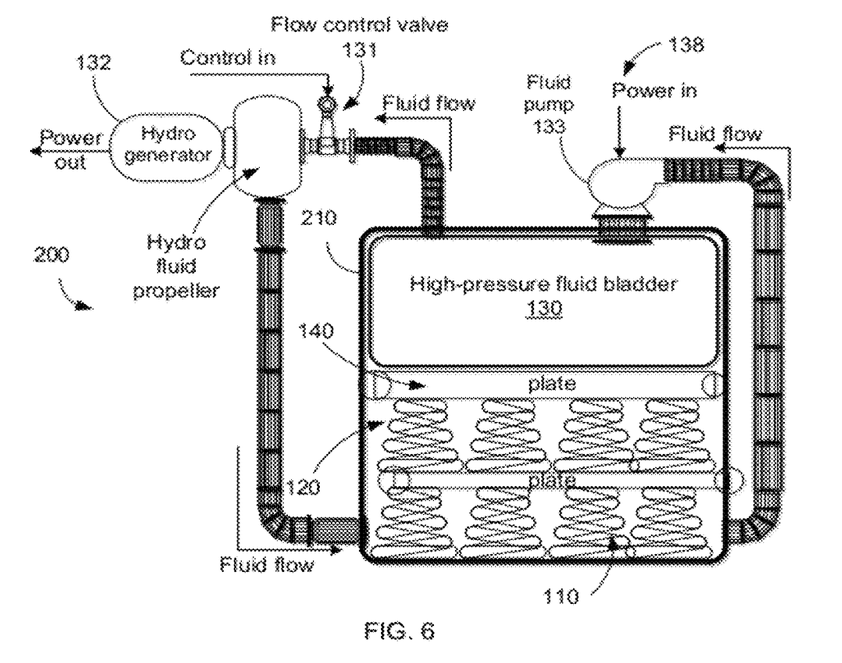
FIGS. 6, 7 and 8 show a spring array in a spring energy container assembly.
Figure 7:
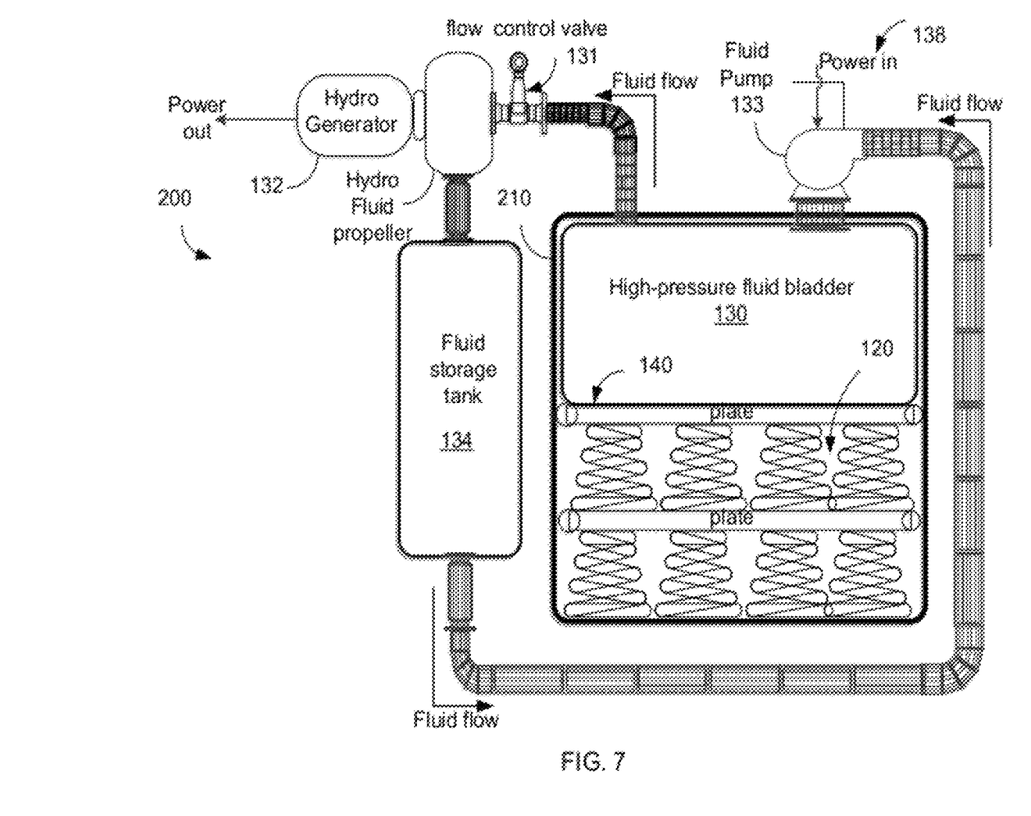
Figure 8:
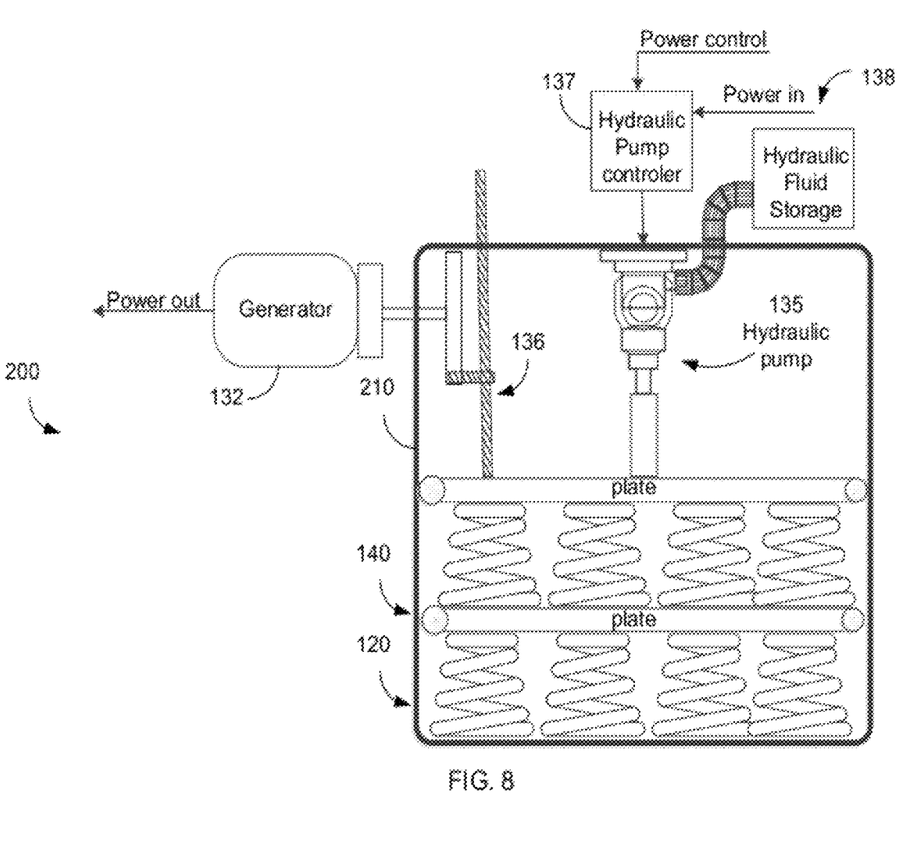

FIGS. 6, 7 and 8 show a spring array in a spring energy container assembly 200.

FIG. 6 shows a spring energy container assembly 200 that stores excess bladder fluid about the springs 100. An enclosure 210 (e.g. 40×8×8 foot steel shipping container) may fully enclose and support a bladder (such as a high-pressure fluid bladder 130). A steel plate 140 above the spring arrays 120 may used to distribute the total spring force from the high-pressure fluid bladder 130 when under pressure. The area of the steel plate 140 and the force of the spring arrays 120 determine the maximum pressure that the high-pressure fluid bladder 130 need to sustain. If needed, pressure in a high-pressure fluid bladder 130 may be lessened by using two or more smaller high-pressure fluid bladder 130. In this case, the spring array 120 and steel plate 140 may be similarly divided into two or more corresponding assembles such that each assemble has a separate high-pressure fluid bladder 130, spring array 120 and steel plate 140. If the energy storage system 200 is contained in an enclosure 210, the storage system 200 may be made more easily portable.

Energy is stored in the energy storage system 200 by running fluid pump 133 by applying power 138 to enable the fluid pump 133 to pump reserve fluid into the high-pressure fluid bladder 130. As the high-pressure fluid bladder 130 fills, pressure from the weight of the fluid and pressure against walls of the enclosure 210 cause a force on the plate 140. The force on the plate 140 causes compression to the spring array 120. In the case shown, the spring array 120 is divided into an upper spring array 120 and a lower spring array 120.

To retrieve energy from the energy storage system 200, a flow control valve 131 is opened to run a hydro fluid propeller of a hydro generator 132. The amount of power generated by the hydro generator 132 is controlled by the flow control valve 131. The hydro generator 132 provides power and the hydro fluid propeller returns the fluid as low pressure reserve fluid.

In FIG. 6, the reserve fluid is stored in the spring array 120 compartments and again used to fill and pressurize the high-pressure fluid bladder 130 via the fluid pump 133.

FIG. 7 shows another implementation as shown in FIG. 6 on one variation. A fluid storage tank 134 external to enclosure 210 is used to store the reserve fluid rather than storing the reserve fluid among the springs 100. The capacity of the fluid storage tank 134 may be equal to or greater than the capacity of the high-pressure fluid bladder 130.

FIG. 8 shows an implementation of an energy storage system 200 including a gearing system 136 to transform the spring energy into electrical energy. The energy storage system 200 includes a plate 140 and a spring array 120 as described above. The energy storage system 200 also includes a hydraulic pump 135, hydraulic pump controller 137, a gearing system 136 and a generator.

To store energy into the energy storage system 200, power 138 is applied to the hydraulic pump 135, which is operated by the hydraulic pump controller 137. The hydraulic pump controller 137 pumps fluid from hydraulic fluid storage into a piston to drive the plate 140 and compress the springs 100.

The retrieve energy from the energy storage system 200, the hydraulic pump controller 137 then switches from a storage-energy mode to a hold mode to a generate-power mode. The hydraulic pump controller 137 releases the hydraulic fluid pressure allowing the plate 140 to rise. As the plate 140 rises, a gear rotates in the gearing system 136, which is attached to a shaft of the generator, which produces electrical energy. That is, mechanical energy of the springs 100 drives the plate 140, which in turn drives the gearing system 136. The gearing system 136 may include a gear that converts vertical movement into rotational movement.

FIGS. 9, 10, 11 and 12 illustrate various block and flow diagrams.

Figure 9:
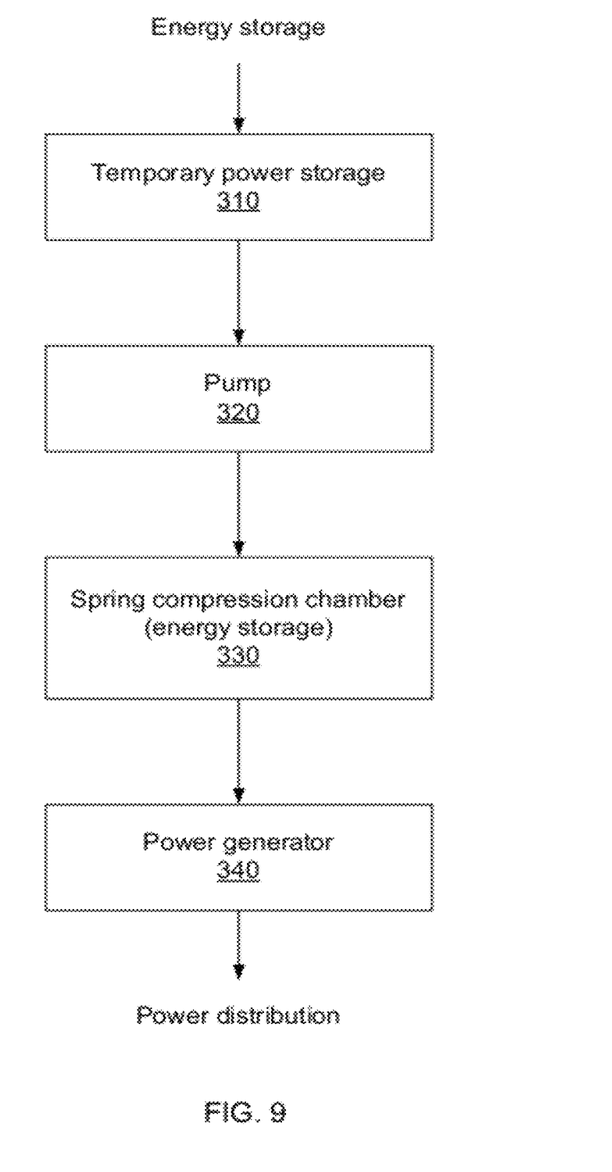
FIGS. 9, 10, 11 and 12 illustrate various block and flow diagrams.

FIG. 9 shows an energy flow diagram of the power storage system. Step 310 shows an energy storage system 200 temporary store the energy produced by an intermittent power source, such as a solar array or a wind turbine. Energy from the intermittent power source powers a pump (such as the fluid pump 133 of FIGS. 6 and 7, or the hydraulic pump 135 of FIG. 8) to store the energy in the spring assembly. At step 320, the pump converts energy from the intermittent power source to fluid flow (e.g., into the high-pressure fluid bladder 130 or hydraulic pump 135). At step 330, the fluid flow is transformed into potential energy in the spring array 120. At step 340, power is generated by converting the potential energy of the spring array 120 to movement in a generator, thereby producing electrical energy for power distribution.

Figure 10:
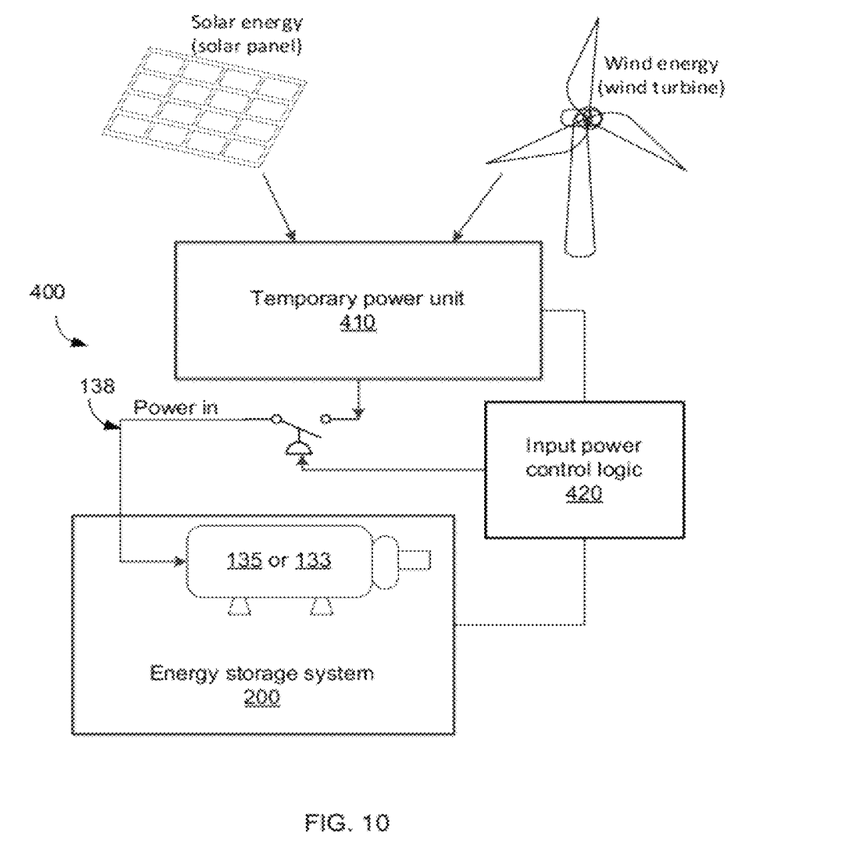

FIG. 10 illustrates an input power control system. In this case, intermittent power is solar energy from a solar panel or wind energy from a wind turbine. A system includes one or more solar panels as well as one or more wind turbines. This system also contains a temporary power unit 410, input power control logic 420, and an energy storage system 200. This intermittent power is used to charge a temporary power unit 410, which may be a chemical battery or super capacitor. A super capacitor, however, has a longer charge and discharge life than a chemical battery. The input power control logic 420 monitors the charge of the temporary power unit 410 and when fully charged, power 138 is applied to the pump (e.g., the fluid pump 133 of FIGS. 6 and 7, or the hydraulic pump 135 of FIG. 8). The input power control logic 420 may also monitor the energy storage system 200. If the energy storage system 200 is full, the input power control logic 420 may shuts off input power to the energy storage system 200. The input power control logic 420 may also switch to charging a second energy storage system 200. The input power control logic 420 may also monitor the energy storage system 200 and the temporary storage unit 410 to determine if a fault has occurred and thereby disabling the faulty system before damage occurs.

Figure 11:
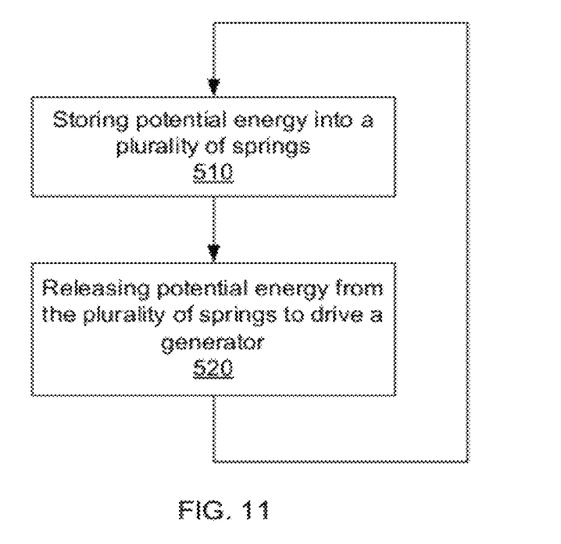

FIG. 11 shows a method to hold energy. At step 510, the method includes storing potential energy into a plurality of springs (such as spring array 120). To store the potential energy, a system may compress, extend or twisting the plurality of springs. This step may include activating a fluid pump (such as fluid pump 133), filling a bladder (such as high-pressure fluid bladder 130) from a reservoir using fluid from the fluid pump 133, and moving a plate 140 coupled to the plurality of springs with the bladder as the bladder fills. The reservoir may be a compartment housing the plurality of springs or may be an external tank (such as fluid storage take 134). Alternatively, this step may include activating a hydraulic pump (such as hydraulic pump 135), moving a plate 140 using the hydraulic pump, and compressing the plurality of springs with the plate 140.

At step 520, the method includes releasing potential energy from the plurality of springs to drive a generator to produce electricity. This step may include opening a flow control valve (such as flow control valve 131) to release the fluid from a bladder and generating electricity with the fluid from the flow control valve. Alternatively, this step may include engaging a gear (such as gearing system 136) coupled to a plate 140, wherein the plate 140 is coupled to the plurality of springs, and releasing fluid from a hydraulic pump to allow the plate 140 to move, and rotating a generator shaft using the gear to generate electricity.

In some embodiments, the potential energy is originally generated from solar energy. Alternatively or in additions, the potential energy is originally generated from wind energy.

Figure 12:
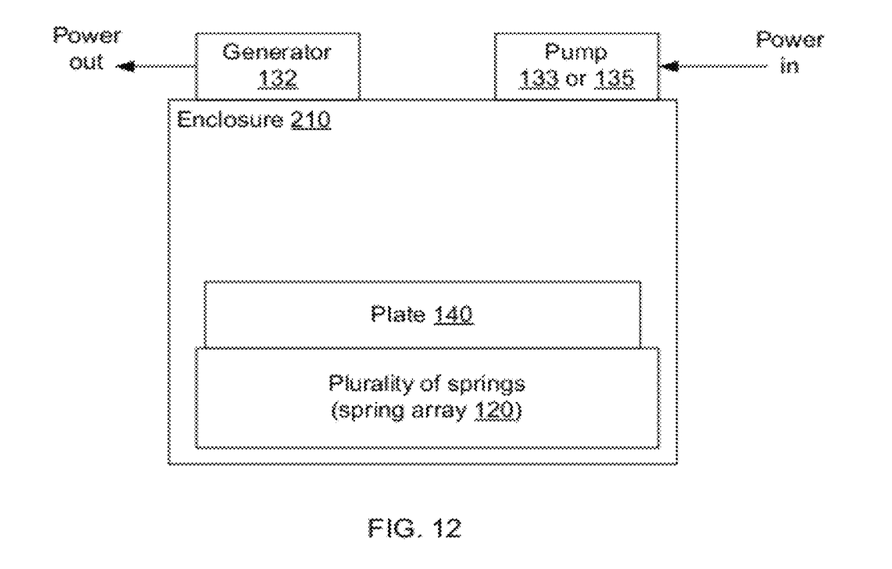

FIG. 12 shows a system for holding energy. The system includes an enclosure (such as enclosure 210), a plurality of springs (such as spring array 120) positioned inside of the enclosure, and a pump (either pump 133 or 135) coupled to the enclosure. The pump is for storing potential energy into the plurality of springs and may be, for example, a fluid pump 133 or a hydraulic pump 135. The system also includes a plate 140 coupled inside of the enclosure and coupled to the plurality of springs and a generator (such as generator 132) coupled to the plate 140. In some embodiments, the system includes a bladder inside of the enclosure, where the bladder is coupled to plate 140 and where the generator operates on fluid from the bladder. In some embodiments, the pump is coupled to an intermittent power source, such as a solar panel and/or a wind turbine. Some embodiments also include a temporary power unit 410 coupled between the energy storage system 200 and the intermittent power source.

Embodiments described above use an intermittent source. For example, the energy storage system 200 may be charged when in intermittent source provides power. Alternatively or in addition, embodiment may require an intermittent sink For example, the energy storage system 200 charges during a time of low demand and then supplies power during a time of high demand. In this manner, the energy storage system 200 acts as a load balancer to store power when it is in lower demand and to supply power when it is in higher demand. Therefore, in some embodiment, storing potential energy into the plurality of springs occurs at a first time of low demand, and releasing potential energy from the plurality of springs to drive the generator occurs at a second time of high demand. A first time of storing potential energy or charging may occur during a workday when a home is empty and a second time of releasing potential energy or draining may occur during an early evening when occupants return home.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A system for holding energy, the system comprising:
    an enclosure;
    a plurality of springs inside of the enclosure;
    a pump coupled to the enclosure, wherein the pump is configured to store potential energy into the plurality of springs and wherein the pump comprises a fluid pump;
    a plate moveably coupled inside of the enclosure and coupled to the plurality of springs;
    a bladder inside of the enclosure, wherein the bladder is coupled to the plate; and
    a generator coupled to the plate;
    wherein the generator operates on the fluid from the bladder.

2. The system of claim 1, wherein the pump is coupled to an intermittent power source.

3. The system of claim 2, wherein the intermittent power source comprises a solar panel.

4. The system of claim 2, wherein the intermittent power source comprises a wind turbine.

5. The system of claim 2, further comprising a temporary power unit coupled between the energy storage system and the intermittent power source.

6. A method of holding energy, the method comprising:
    storing potential energy into a plurality of springs, wherein storing potential energy into the plurality of springs comprises:
        activating a fluid pump;
        filling a bladder from a reservoir using the fluid pump; and
        moving a plate coupled to the plurality of springs with the bladder; and
    releasing potential energy from the plurality of springs to drive a generator to produce electricity.

7. The method of claim 6, wherein storing potential energy into the plurality of springs comprising compressing the plurality of springs.

8. The method of claim 6, wherein storing potential energy into the plurality of springs comprising extending the plurality of springs.

9. The method of claim 6, wherein storing potential energy into the plurality of springs comprising twisting the plurality of springs.

10. The method of claim 6, wherein the reservoir comprises a compartment housing the plurality of springs.

11. The method of claim 6, wherein the reservoir comprises a fluid storage tank.

12. The method of claim 6, wherein storing potential energy into the plurality of springs comprising:
    compressing the plurality of springs with the plate.

13. The method of claim 6, wherein releasing potential energy from the plurality of springs to drive the generator comprises:
    opening a flow control valve to release fluid from the bladder; and
    generating electricity with the fluid from the flow control valve.

14. The method of claim 6, wherein releasing potential energy from the plurality of springs to drive the generator comprises:
    engaging a gear coupled to the plate;
    releasing a fluid from the fluid pump to allow the fluid plate to move; and
    rotating a generator shaft using the gear to generate electricity.

15. The method of claim 6, wherein the potential energy is originally generated from solar energy.

16. The method of claim 6, wherein the potential energy is originally generated from wind energy.

17. The method of claim 6, wherein:
    storing potential energy into the plurality of springs occurs at a first time of low demand; and
    releasing potential energy from the plurality of springs to drive the generator occurs at a second time of high demand.

* * * * *